United States Patent Office 3,490,915
Patented Jan. 20, 1970

3,490,915
METHOD OF PREPARING A READY-TO-EAT OAT CEREAL
Donald K. Tressler, P.O. Box 649,
Westport, Conn. 06880
No Drawing. Filed Feb. 28, 1967, Ser. No. 619,171
Int. Cl. A23l *1/10*
U.S. Cl. 99—80                                   7 Claims

ABSTRACT OF THE DISCLOSURE

Method of preparing ready to eat oat cereal to which boiling water is added and stirred to make a "cooked" cereal, wherein rolled oat flakes are heated with dry heat to not more than about 400° F., and the flakes pressed under high pressure to rupture and open the fibers and cause capillary action when boiling water is applied.

---

This invention relates to a novel process of making an instant oat cereal of agreeable flavor and has for its principal object the provision of a process of treating rolled oats to provide an "instant" oat flake cereal which has a "cooked" flavor as distinguished from the raw flavor usually associated with uncooked oat cereals, which is more readily digestible than cooked oatmeal, and which can be prepared in a few seconds at the table by the addition of boiling water accompanied by stirring with a spoon.

Regular old fashioned "oat flakes" (rolled oats) absorb water very slowly and require at least 10 minutes cooking in order to prepare them for use as a breakfast cereal. More recently, a number of oat flake cereals have become available which can be prepared for the table by the proper amounts of boiling water which is stirred with the flakes for a period of one to 3 minutes. The flavor of such cereals, however, is much the same as that of the raw oat flakes.

The improved process of the present invention involves two treatments of the regular oat flakes which should be performed separately but which one is performed first is not too important. One treatment is to heat the regular oat flakes with dry heat to a temperature of between 225° and 400° F. which removes the "raw" taste and makes the flakes highly absorptive of boiling water. This treatment alone would not produce the desired result since about 3 minutes is required after this heat treatment alone for the flakes to take up the necessary amount of boiling water to convert them into a product resembling the oat cereal produced by cooking oat flakes on top of the stove.

The second treatment is to place the oat flakes under high pressure to produce flakes which are thinner and somewhat smaller than conventional flakes, and this pressure treatment also causes the flakes to absorb water much more rapidly. In fact, it has been found that if the flakes are heated for a proper length of time and than pressed or rolled under high pressure 20 grams of the thin flakes will absorb 110 grams of boiling water in 30 to 40 seconds as the flakes are being stirred. This product when eaten is not as sticky or gummy as that made by cooking oat flakes 10 or 12 minutes although in many respects it does resemble the product prepared by cooking on top of the stove and has been found to be more readily digestible than the conventional cooked oatmeal cereal.

Sometimes it has been found desirable to press the oats in bulk in relatively thick layers, e.g. an inch in thickness. After this initial pressing, the oat cake should be broken up and then pressed or passed between pressing rollers a second time in a much thinner layer.

The amount of pressure in either the first or second operation may vary but it should be sufficiently great as to rupture and open the fibers and crack the oat particle internally to such an extent as to form capillaries in it. Any means for applying pressure may be used such as pressing rollers or mechanical presses. If desired, the heat may be applied between the first and second pressing operations just referred to, or the entire pressing operation may be performed first, after which the high dry heat may be applied.

Another variation in the process of the present invention to provide a product of improved flavor characteristics is to spray the regular oat flakes with a flavoring solution before either heat or pressure is applied or as a separate step between the steps of heating or applying pressure.

The solution so sprayed can either be a salt solution or a sugar solution or a combination of both. The damp flakes should be dried before pressing if the highly absorptive thin flakes are to be obtained. In order to avoid the possibility of the flakes becoming pasty when heated, they should be dried slowly. Ideally, the flakes should be sprayed, with the flavoring solution, then dried to less than 10% moisture, and then heated to a temperature of between 225° and 400° F. and finally pressed.

If special flavors are desired, the oat flakes may be wetted with fruit juices, fruit purees or imitation of pure fruit flavors, then carefuly dried and pressed, or the oat flakes may be heated to 225° to 400° F., then wetted with fruit juices, purees, or imitation fruit flavors or pure fruit flavors, then dried and pressed sufficiently to form capillaries and make them highly absorptive.

No details of the steps taken in preparing the regular oat flakes, which is the starting material for the present process, are given here for the reason that the process is well known. In general, the groats and hulls are removed from the oats, which are then softened by steaming or simply by adding moisture. The oats are then passed between rollers which exert only a limited amount of pressure.

The pressure applied as the first or second step of the present process is of a much higher order and thoroughly cracks the flake to make it act as a capillary when boiling water is applied to it. It was earlier pointed out that whether the pressing or the heating step is performed first does not make too much difference. In most instances, however, it is preferred to apply the heat first since it removes the moisture and to a certain extent reduces the amount of pressure which must be employed to rupture and open the fibres and achieve the desired capillary action.

The application of the heat does more than eliminate the raw taste. It makes the flakes rather brittle so that when a desired degree of pressure is applied it cracks the flakes to form the capillaries which attract or draw in the hot water when this is applied. The heat should not be in excess of 400 F. since the higher heat tends to brown the flakes and give them a scorched flavor and the odor of burned hair.

Heat less than 225° F. can be used except that too much time is required as will be noted from the following table showing results from actual tests:

| Temperature: | Time |
|---|---|
| 225° F. | 30 min. to 1 hr. |
| 250° F. | 15 min. to 30 min. |
| 300° F. | 10 min. to 18 min. |
| 350° F. | 6 min. to 10 min. |
| 400° F. | 5 min. to 7 min. |

In tests to determine the most desirable pressure required to produce the quick cooking oat flakes from flakes that had been heated 10 minutes at 300° F., it was found that fair results could be obtained at 500 lbs. per square inch; more absorptive flakes were produced at 1000 lbs. per square inch pressure, and an excellent product was obtained using 10,000 lbs. per square inch pressure. In general, it may be said that the pressure should be sufficient to flatten the flakes at least one-half their original thickness after the pressing operation.

The embodiments of the invention in which an exclusive property or privilege is claimed are defined as follows:

1. The method of making a ready-to-eat oat cereal from uncooked rolled oat flakes which can be prepared for eating by the addition of boiling water and stirring for less than a minute to produce a cereal with a cooked flavor and which is characterized by an absence of a sticky and gummy consistency, which method consists in the steps of separately applying pressure and heat to said uncooked oat flakes, the heating step consisting of applying dry heat at a temperature of between 225° and 400° F. for a sufficient time to eliminate the "raw" taste and render the flakes brittle, the pressure step consisting in applying mechanical pressure of at least 200 p.s.i. to thoroughly crack the flakes to open the fibres and make them receptive to boiling water.

2. The method defined in claim 1 wherein pressure is applied to the flakes in two steps and in which the first consists in feeding a relatively thick layer of the flakes to the pressure applying means, after which the pressed flakes are broken up and again pressed in a thinner layer.

3. The method defined in claim 1 wherein the flakes are sprayed with a flavoring solution after which the flakes are subjected to the heat.

4. The method defined in claim 1 wherein the flakes are sprayed with a flavoring solution between the steps of heating or applying pressure.

5. The method defined in claim 1 wherein there is applied to the flakes flavoring solutions selected from the class consisting of fruit juice, fruit purees and imitation fruit flavors.

6. The method defined in claim 1 wherein the heating step is performed after the pressure applying step.

7. The method defined in claim 1 wherein the pressure applying step is performed after the heating step.

References Cited

UNITED STATES PATENTS

| 3,241,978 | 3/1966 | Hreschak | 99—80 |
| 3,345,183 | 10/1967 | Lilly et al. | 99—80 |

LIONEL M. SHAPIRO, Primary Examiner

J. R. HOFFMAN, Assistant Examiner